US011979710B2

(12) United States Patent
Song et al.

(10) Patent No.: US 11,979,710 B2
(45) Date of Patent: May 7, 2024

(54) HOLOGRAPHIC-BASED DIRECTIONAL SOUND DEVICE

(71) Applicants: PUSAN NATIONAL UNIVERSITY INDUSTRY-UNIVERSITY COOPERATION FOUNDATION, Busan (KR); CENTER FOR ADVANCED META-MATERIALS, Yuseong-gu (KR)

(72) Inventors: Kyungjun Song, Busan (KR); Hak Joo Lee, Daejeon (KR); Jun Hyuk Kwak, Sejong-si (KR); Jong Jin Park, Sejong-si (KR)

(73) Assignees: PUSAN NATIONAL UNIVERSITY INDUSTRY-UNIVERSITY COOPERATION FOUNDATION, Busan (KR); CENTER FOR ADVANCED META-MATERIALS, Daejeon (KR)

( * ) Notice: Subject to any disclaimer, the term of this patent is extended or adjusted under 35 U.S.C. 154(b) by 125 days.

(21) Appl. No.: 17/771,335

(22) PCT Filed: Sep. 23, 2020

(86) PCT No.: PCT/KR2020/012899
§ 371 (c)(1),
(2) Date: Apr. 22, 2022

(87) PCT Pub. No.: WO2021/080196
PCT Pub. Date: Apr. 29, 2021

(65) Prior Publication Data

US 2022/0386020 A1 Dec. 1, 2022

(30) Foreign Application Priority Data

Oct. 23, 2019 (KR) ........................ 10-2019-0131992

(51) Int. Cl.
*H04R 1/32* (2006.01)
*H04R 1/28* (2006.01)
(Continued)

(52) U.S. Cl.
CPC ........... *H04R 1/345* (2013.01); *H04R 1/2803* (2013.01); *H04R 1/32* (2013.01); *G10K 11/28* (2013.01); *G10K 11/30* (2013.01)

(58) Field of Classification Search
CPC ........ H04R 1/345; H04R 1/2803; H04R 1/02; H04R 1/1091; H04R 1/32; G10K 11/32; G10K 11/36
(Continued)

(56) References Cited

U.S. PATENT DOCUMENTS 10,991,359 B2 * 4/2021 Pompei ................ H04R 19/013
11,551,661 B2 * 1/2023 Song ...................... G10K 11/32
(Continued)

FOREIGN PATENT DOCUMENTS

KR 10-2011-0097584 A 8/2011
KR 10-2013-0033723 A 4/2013
(Continued)

OTHER PUBLICATIONS

International Search Report for International Application No. PCT/KR2020/012899 (4 pages in English, 3 pages in Korean).

*Primary Examiner* — Disler Paul
(74) *Attorney, Agent, or Firm* — NSIP Law

(57) ABSTRACT

A holographic-based directional sound device is provided, the device including: a sound wave generating means generating a sound wave; and a flat plate configured to have the sound wave generating means installed at the center so as to radiate the sound wave to the outside through a surface, and to be composed of a plurality of unit cells, in which at least one groove is formed on a surface of the unit cell, and a radiation angle of the sound wave is determined according to a depth of the groove with respect to the unit cell, wherein the depth of the groove is determined by an individual surface admittance calculated by a cosine function or a sine function of the sum of a first value and a second value on the basis of a preset radiation angle of the sound wave and a preset frequency of the sound wave.

10 Claims, 10 Drawing Sheets

(51) Int. Cl.
*H04R 1/34* (2006.01)
*G10K 11/28* (2006.01)
*G10K 11/30* (2006.01)

(58) Field of Classification Search
USPC .............................................. 381/77–78, 98
See application file for complete search history.

(56) References Cited

U.S. PATENT DOCUMENTS

| | | | | |
|---|---|---|---|---|
| 2016/0057529 | A1* | 2/2016 | Kappus ................ | H04R 1/1075 381/74 |
| 2021/0049995 | A1 | 2/2021 | Song et al. | |

FOREIGN PATENT DOCUMENTS

| | | | |
|---|---|---|---|
| KR | 10-2013-0116373 | A | 10/2013 |
| KR | 10-1574794 | B1 | 12/2015 |
| KR | 10-2016-0012838 | A | 2/2016 |
| KR | 10-2018-0027001 | A | 3/2018 |
| KR | 10-1975022 | B1 | 5/2019 |
| KR | 10-2020-0022932 | A | 3/2020 |
| KR | 10-2151358 | B1 | 9/2020 |

* cited by examiner

HOLOGRAPHIC-BASED DIRECTIONAL SOUND DEVICE

CROSS-REFERENCE TO RELATED APPLICATIONS

This application is a U.S. National Stage Application of International Application No. PCT/KR2020/012899 filed on Sep. 23, 2020, which claims the benefit under 35 USC 119(a) and 365(b) of Korean Patent Application No. 10-2019-0131992, filed on Oct. 13, 2019, in the Korean Intellectual Property Office, the entire disclosure of which is incorporated herein by reference for all purposes.

TECHNICAL FIELD

The present invention relates to a holographic-based directional sound device that makes a sound wave generated by a sound wave generating means have directivity such that the sound wave is radiated in a specific direction.

BACKGROUND ART

A typical sound device radiates sound waves in all directions without directivity, as the sound waves are radiated omni-directionally. In addition, the typical normal sound device is such that the sound waves are inevitably dispersed in all directions as they are radiated without directivity. Therefore, the normal sound device has limitations in that the sound waves are neither radiated in a desired specific direction nor transmitted a specific distance.

In order to overcome these limitations, a sound device that guides the sound wave radiated from the sound wave generating means to be radiated in a specific direction by installing a blocking plate or a horn, etc., on the outside or in front of the sound wave generating means; and a sound device in which a plurality of sound wave generating means are arranged in a certain shape such as radial and fixed with a fixing member to maintain the arrangement, so that the sound wave radiated from each sound wave generating means is radiated in a specific direction, and the like has been developed.

However, in these sound devices, blocking plates or horns are provided on the sound wave generating means, or a plurality of sound wave generating means is used and thus and a fixing structure for supporting it is separately required, whereby the size of the sound device significantly increases, resulting in that a large installation space must be secured. Therefore, there are problems that the installation is not easy and the installation space is insufficient.

Thus, in the field of acoustic applications, research and development is in progress on a directional sound device that can radiate sound waves in a specific direction while improving the space utilization and eliminating the restrictions of installation by minimizing the volume.

As a result of such research and development, a directional sound device that can radiate sound waves in a specific direction by configuring the surface admittance as a periodic sine function or cosine function to have high directivity at a specific frequency has been developed. This is configured to have a sound wave generating unit that generates a sound wave, and a flat plate having the sound wave generating unit installed in the center and having a plurality of grooves recessed on the surface.

That is, as the surface admittance of the flat plate is determined according to the depth, width, and spacing dimensions of the groove, the sound waves generated by the sound wave generator are radiated vertically from the surface of the flat plate.

However, a directional sound device using a surface admittance has a limit that sound waves cannot be radiated in any direction other than the vertical direction, because the sound waves can only be radiated in the vertical direction of the flat plate depending on the depth, width, and spacing of the grooves formed on the surface of the flat plate.

Accordingly, in order to align the transmission direction of the sound wave in a specific direction, since the flat plate is fixed with a separate fixing member, the installation angle must be adjusted to correspond to the sound wave transmission direction, so that the structure becomes more complicated and the volume increases due to the addition of the fixing member, and manufacturing cost increases, and the installation space is large, whereby there are still restrictions on installation.

Therefore, there is a need for an improved structure of the sound device having directivity so that the direction of the sound wave radiated through the surface of the flat plate can be adjusted in a predetermined direction without arbitrarily adjusting the installation angle of the flat plate, in order to simplify the structure and minimize the volume, and reduce the manufacturing cost and the installation space, thereby eliminating the installation restrictions.

DISCLOSURE

Technical Problem

The present invention has been made keeping in mind the above problems occurring in the related art, and an objective of the present invention is to provide a holographic-based directional sound device, which is capable of adjusting the direction of a sound wave radiated forward through a surface of a flat plate to correspond to a predetermined direction without arbitrarily adjusting the installation angle of the flat plate, in order to simplify the structure and minimize the volume, and reduce manufacturing costs and installation space, thereby eliminating restrictions on its installation.

The objective of the present invention is not limited to the object mentioned above, and other objectives not mentioned will be clearly understood from the description below.

Technical Solution

In order to achieve the above object, a holographic-based directional sound device according to the present invention includes a sound wave generating means generating a sound wave; and a flat plate configured to have the sound wave generating means installed at the center thereof so as to radiate the sound wave to the outside through a surface thereof, and to be composed of a plurality of unit cells, in which at least one groove is formed on a surface of the unit cell, and a radiation angle of the sound wave is determined according to a depth of the groove with respect to the unit cell, wherein the depth of the groove with respect to the unit cell is determined by an individual surface admittance calculated by a cosine function or a sine function of the sum of a first value and a second value on the basis of a predetermined radiation angle of the sound wave and a preset frequency of the sound wave, the first value being obtained by multiplying a frequency of the sound wave by a refractive index according to the surface of the unit cell and a radial distance from the center of the flat plate to the unit cell, and the second value being obtained by multiplying the frequency of the sound wave by a position value of the unit cell and the radiation angle of the sound wave.

Advantageous Effects

The present invention by the above configuration can expect the following effects.

First, as the sound wave radiated through the surface of the flat plate can be adjusted to the desired radiation angle by the change in the depth of the groove provided on the surface of the flat plate, there are advantages that the structure can be simplified and the space efficiency can be increased, without a need to arbitrarily adjust the angle of the flat plate or install a device for steering sound waves on the flat plate.

Since the flat plate is divided into a plurality of unit cells, so that the holographic acoustic admittance surface designed in various shapes according to the radiation angle of the sound wave can be easily applied to the surface of the flat plate, the radiation angle of the sound wave can be freely adjusted.

BEST MODE

Figure 1:
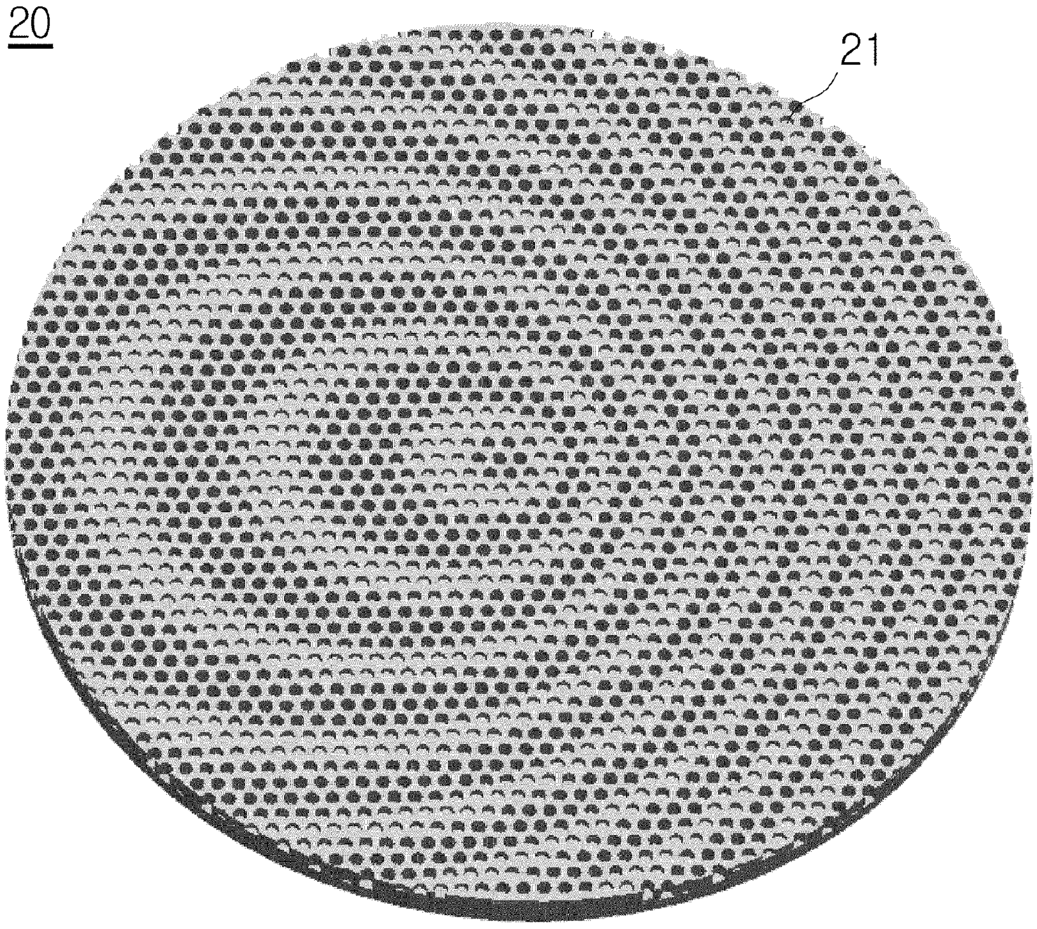
FIG. 1 is a perspective view showing a flat plate of a holographic-based directional sound device according to a preferred embodiment of the present invention.

In order to achieve the above objective, the holographic-based directional sound device according to the present invention includes: a sound wave generating means generating a sound wave; and a flat plate configured to have the sound wave generating means installed at the center thereof so as to radiate the sound wave to the outside through a surface thereof, and to be composed of a plurality of unit cells, in which at least one groove is formed on a surface of the unit cell, and a radiation angle of the sound wave is determined according to a depth of the groove with respect to the unit cell, wherein the depth of the groove with respect to the unit cell is determined by an individual surface admittance calculated by a cosine function or a sine function of the sum of a first value and a second value on the basis of a preset radiation angle of the sound wave and a preset frequency of the sound wave, the first value being obtained by multiplying a frequency of the sound wave by a refractive index according to the surface of the unit cell and a radial distance from the center of the flat plate to the unit cell, and the second value being obtained by multiplying the frequency of the sound wave by a position value of the unit cell and the radiation angle of the sound wave.

MODE FOR INVENTION

The present invention relates to a holographic-based directional sound device that allows a sound wave generated by a sound wave generating means to be radiated while having directivity through a surface of a flat plate.

In particular, the holographic-based directional sound device according to the present invention is characterized in that the radiation angle of the sound wave can be adjusted to a desired radiation angle, by changing the surface structure of the flat plate, rather than arbitrarily adjusting the angle of the flat plate or installing a device for steering sound waves on the flat plate.

Such feature is achieved, when forming a plurality of grooves on the surface of the flat plate in a recessed manner, by designing and applying a depth combination of the plurality of grooves to correspond to the pattern of acoustic holographic admittance, to correspond to the surface admittance to the surface of the flat plate that determines the radiation angle of the sound wave.

Hereinafter, a holographic-based directional sound device according to a preferred embodiment of the present invention will be described in detail with reference to the accompanying drawings.

A holographic-based directional sound device according to a preferred embodiment of the present invention may be configured to include a sound wave generating means 10, a flat plate 20, and a sound wave receiving means (not shown).

First, the sound wave generating means 10 is configured to generate sound waves.

Here, the sound wave generating means 10 may include a speaker that generates sound waves, an ultrasonic wave generator that generates ultrasonic waves, an underwater sound wave generator that generates a sound wave or an ultrasonic wave in water.

Next, the flat plate 20 is shaped in a disk having a predetermined thickness, and is configured to radiate sound waves generated by the sound wave generating means 10 to the outside through its surface.

FIG. 1 is a perspective view showing a flat plate of a holographic-based directional sound device according to a preferred embodiment of the present invention.

According to FIG. 1, a plurality of grooves 21 are recessed at regular intervals on the surface of the flat plate 20 with the center as the origin.

That is, the plurality of grooves 21 are formed on the surface of the flat plate 20, and the flat plate 20 has a surface admittance according to the diameter, depth and spacing of the plurality of grooves 21, in which the surface wave according to the sound wave may be converted into a radiation wave so that the sound wave is radiated to the outside by the surface admittance.

In addition, the sound wave radiated to the outside through the surface of the flat plate 20 has a radiation angle adjustable by the surface admittance to the surface of the flat plate 20, which may be changed according to a combination of the diameter, depth, and spacing formed by the plurality of grooves 21.

Here, the surface admittance with respect to the entire surface of the flat plate 20 may be determined by a combination of diameters, depths, and spacing of the plurality of grooves 21. The diameter, depth, and spacing of the groove may be formed smaller than the wavelength of the sound wave. The groove may be formed in a cylindrical shape, a polygonal shape, or the like.

Meanwhile, a depth combination of the plurality of grooves may be determined, on the basis of a predetermined radiation angle and frequency of the sound wave, by a cylindrical surface wave along the surface of the flat plate, and a surface admittance calculated on the basis of cutoff frequency, energy limiting efficiency, and refractive index due to mutual interference between the surface wave and a radiation wave according to the radiation angle of the sound wave.

Here, the flat plate 20 may be composed of a plurality of unit cells 20*a* so that the surface admittance to the surface of the flat plate 20 may be easily applied to the surface of the flat plate 20 according to the depth combination of the plurality of grooves 21. That is, the flat plate 20 may have a form in which the plurality of unit cells 20*a* is arranged.

Here, the unit cell 20*a* may be formed in a polygonal shape, including a quadrangle, a hexagon, an octagon, and the like. In addition, the diameter, depth, and spacing of the grooves 21 for the unit cells 20*a* adjacent to each other may be formed differently to have different surface admittances.

Figure 2A:
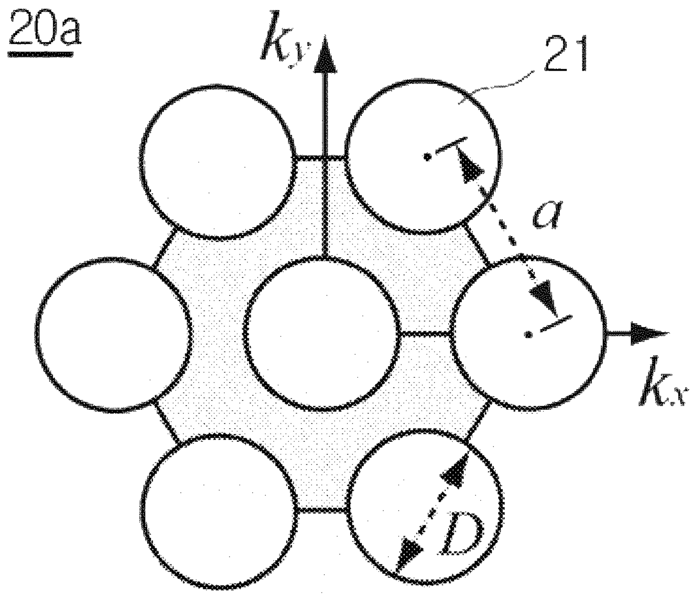
FIGS. 2A-2B are exemplary diagrams illustrating a planar shape and a vertical cross-sectional shape of a unit cell constituting a flat plate of a holographic-based directional sound device according to a preferred embodiment of the present invention.
Figure 2B:
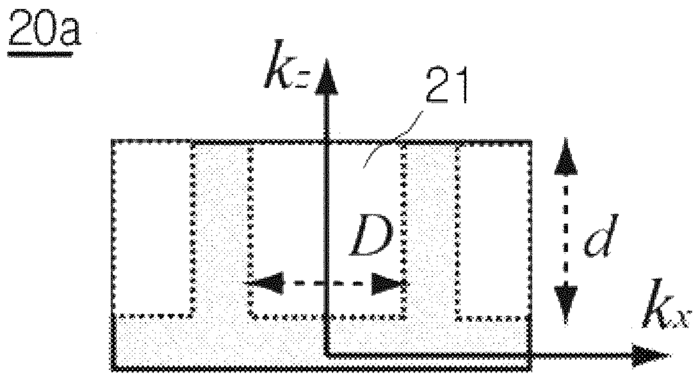

FIGS. 2A-2B are exemplary diagram illustrating a planar shape and a vertical cross-sectional shape of a unit cell constituting a flat plate of a holographic-based directional sound device according to a preferred embodiment of the present invention.

According to FIGS. 2A-2B, the plurality of unit cells 20*a* has a hexagonal shape such that the same wavenumber is achieved for surface waves with respect to almost all directions in the XY plane. The plurality of unit cells 20*a* have the grooves 21 formed through at regular intervals, one at its center, and one at its edge, so that the surface admittance may be easily adjusted.

Therefore, the individual surface admittance may be individually set for each unit cell 20*a* constituting the flat plate 20 through the depth of the groove 21 for each unit cell 20*a*, so that the radiation angle of the sound wave radiated through the surface of the flat plate 20 may be freely adjusted.

Meanwhile, the individual surface admittance for each unit cell 20*a* may be calculated from the following Equation 1.

$$Y=jY_0Y_{avg}[1+M\cos(knr+kx\sin\theta] \quad \text{[Equation 1]}$$

Where, $Y_0$ is the surface admittance of the surrounding medium, $Y_{avg}$ is the average surface admittance to the surface of the flat plate, M is the modulation depth, k is the frequency of the sound wave, n is the predetermined refractive index according to the planar structure of the flat plate, r is the radial distance from the center of the flat plate to the unit cell 20*a*, and x is the position on the surface of the flat plate with respect to the unit cell 20*a*.

Figure 5:
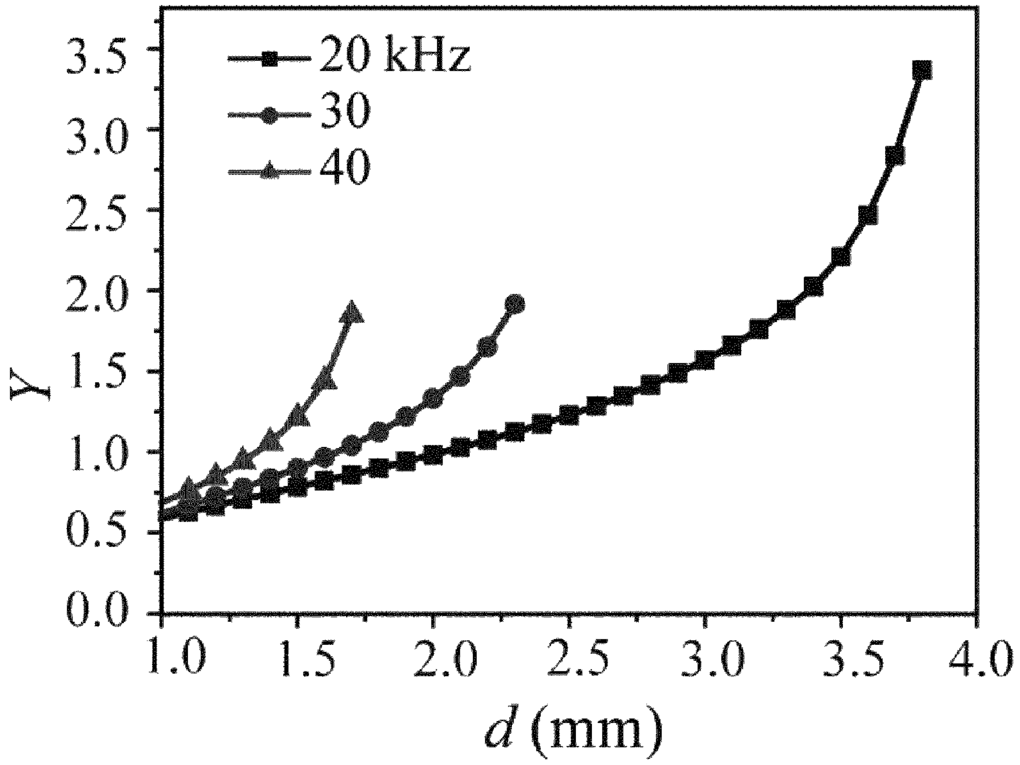
FIG. 5 is a graph showing the relationship between the surface admittance and the depth of the groove formed in the flat plate in a holographic-based directional sound device according to a preferred embodiment of the present invention.

FIG. 5 is a graph showing the relationship between the surface admittance and the depth of the groove formed in the flat plate in a holographic-based directional sound device according to a preferred embodiment of the present invention.

The depth of the through groove 21 for each unit cell 20*a* may be obtained by applying the individual surface admittance for each unit cell 20*a* calculated through Equation 1 to the graph of FIG. 5.

Figure 6:
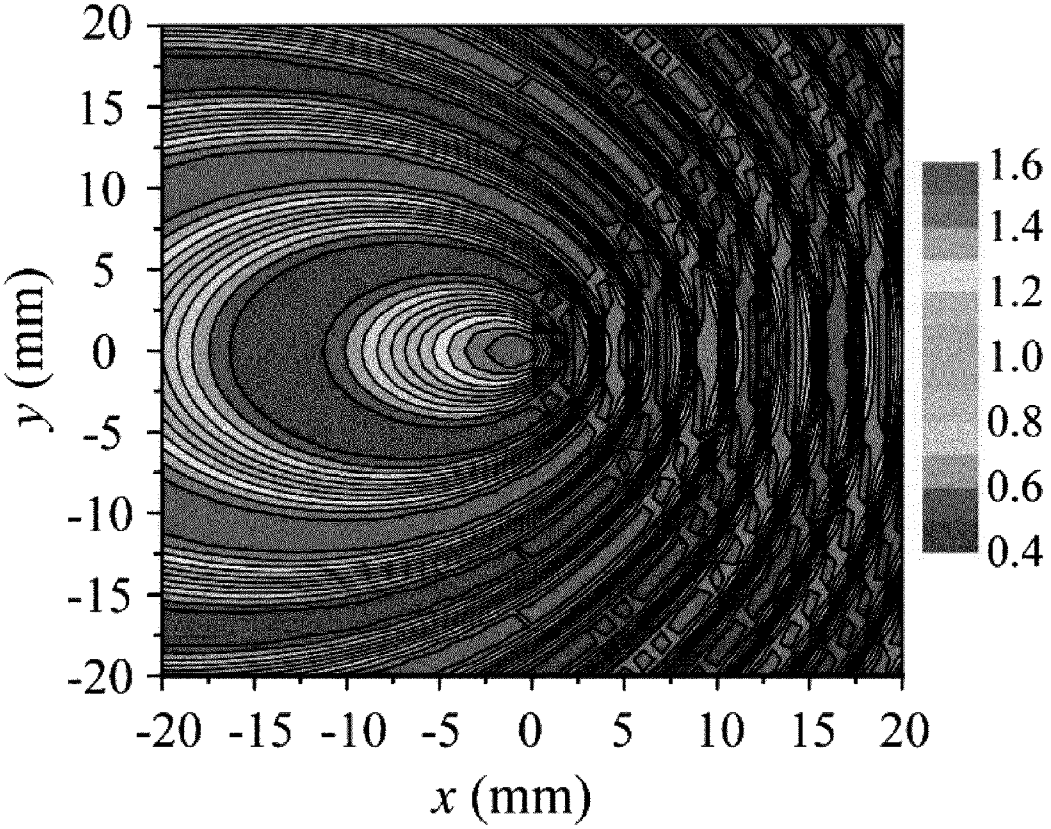
FIG. 6 is an image illustrating a surface admittance pattern for use in designing a holographic acoustic admittance surface in a holographic-based directional sound device according to a preferred embodiment of the present invention.

FIG. 6 is an image showing a surface admittance pattern for use in designing a holographic acoustic admittance surface in a holographic-based directional sound device according to a preferred embodiment of the present invention.

According to FIG. 6, the holographic acoustic admittance surface for the flat plate 20 may be obtained by allowing the depth of the groove 21 to be applied for each unit cell 20*a* on the XY plane to correspond to the surface of the flat plate 20 in consideration of the position of the flat plate 20 for each unit cell 20*a*.

That is, the depth of the groove 21 for the unit cell 20*a* may be uniformly formed along the elliptical direction on the surface of the flat plate 20 while forming a repetitive periodic curve along the radial direction of the flat plate 20.

The depth of the groove 21 for the unit cell 20*a* may be formed to have a higher degree of deviation from the circle by increasing the difference between the radius of one side and the radius of the other side with respect to the center in the elliptical direction, so that the sound wave has directivity at a predetermined radiation angle along the normal direction to the surface of the flat plate 20.

Hereinafter, a process of deriving Equation 1 to obtain a holographic acoustic admittance surface, a process of designing the flat plate 20 using the holographic acoustic admittance surface according to Equation 1, and the performance test result of the designed flat plate 20 will be described in detail with reference to the accompanying drawings as follows.

A surface wave in the XY plane for a sound wave may be represented as $\exp(-jk_t l)\exp(-\gamma z)$. Here, $k_t$ is the longitudinal wavenumber in the XY plane, $\gamma$ is the damping factor constant in the Z direction, and z is the length of the XY plane.

According to the distribution relationship, $\gamma^2=k_t^2-k_0^2$ is defined. Here, $k_0$ is the free space wavenumber. According to the law of conservation of momentum, particle velocity $v_z$ in the z direction may be represented as Equation 2 below.

$$v_z = \frac{j\gamma}{\omega\rho}\exp(-jk_t l)\exp(-\gamma z) \quad \text{[Equation 2]}$$

According to a relationship between the sound pressure p and the normal particle velocity $v_z$, the effective surface admittance Y may be represented as Equation 3 below.

$$Y = \frac{v_z}{p} C_{z=0} \quad \text{[Equation 3]}$$

At the surface boundary of z=0, the surface admittance for the flat plate is $$Y = j\frac{1}{\rho c}\frac{\gamma}{k_0} = jY_0\frac{\gamma}{k_0}.$$

Here, p is the density, c is the speed of sound in air, and $$Y_0 = \frac{1}{\rho c}$$

is the free space admittance.

The refractive index n may be represented as $n=ck_t/\omega$. Then, the surface admittance Y may be represented as Equation 4 below.

$$Y=Y_0\sqrt{1-n^2} \quad \text{[Equation 4]}$$

That is, the refractive index may be easily adjusted by the difference in wavenumber between the plane surface wave and the free space wave, thereby easily adjusting the surface admittance.

The refractive index may be changed with respect to the propagation direction, which induces a change in the surface admittance through a change in the depth of the groove 21 at the frequency of a predetermined sound wave, and thus the pattern of the holographic acoustic admittance surface may be designed in various forms through the diversity of the depth of the groove 21.

Figure 4:
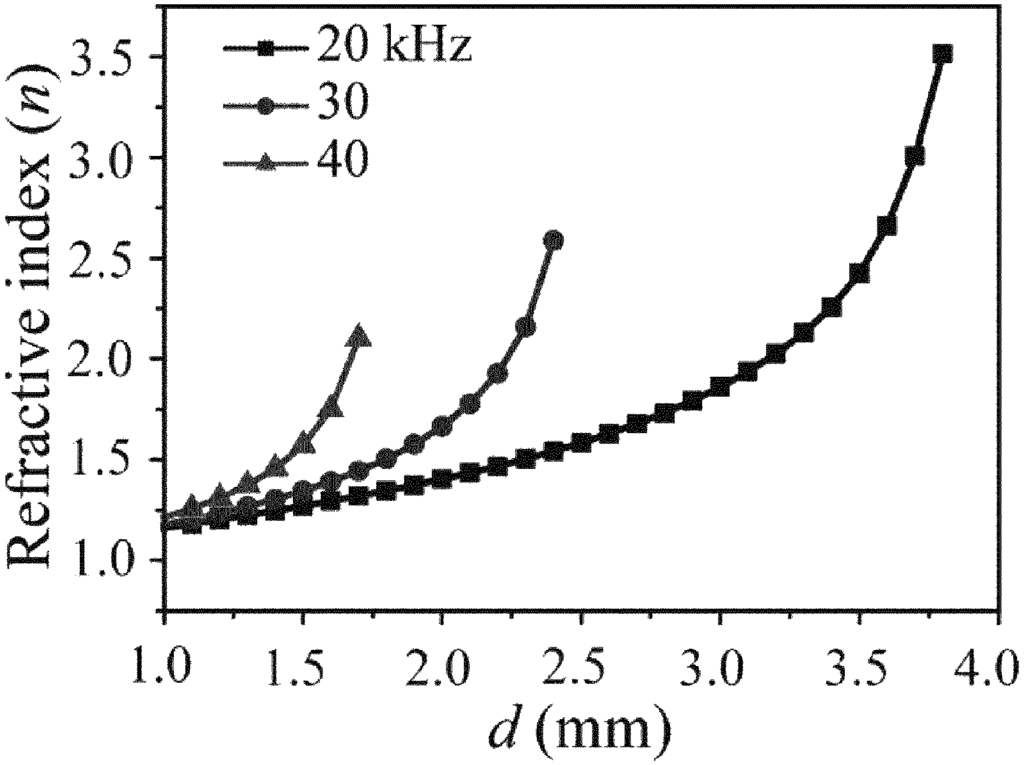
FIG. 4 is a graph illustrating a relationship between the refractive index and the depth of a groove formed in a flat plate in a holographic-based directional sound device according to a preferred embodiment of the present invention.

FIG. 4 is a graph showing the relationship between the depth of a groove formed in a flat plate and refractive index in a holographic-based directional sound device according to a preferred embodiment of the present invention, in which the blue curve shows the refractive index for the acoustic frequency of 20 kHz, the red curve shows the refractive index for the acoustic frequency of 30 kHz, and the black curve shows the acoustic frequency of 40 kHz.

According to FIG. 4, it may be seen that as the depth of the groove 21 increases, the restraint on the sound wave on the surface is strengthened and thus the refractive index increases.

According to Equation 4, a change in the surface admittance may be obtained through a change in the depth of the groove 21, which may be confirmed through the graph of FIG. 5 showing the change in the surface admittance according to the depth of the groove 21.

According to FIGS. 4 and 5, it may be seen that when the depth of groove 21 is changed from 1.0 to 2.5 at an acoustic frequency of 30 kHz, the refractive index is changed from 1.1 to 2.5, and the surface admittance is changed from 0.6 to 2.5.

When a regression curve is expressed as a function of the depth of the groove 21 through numerical data on the change in refractive index according to the depth of the groove 21 shown in FIG. 4, it may be expressed by Equation 5 below.

$$\frac{Y}{jY_0} = f(d) \quad \text{[Equation 5]}$$

Where, $Y_0$ is the surface admittance of surrounding medium. f(d) in the regression curve is suitable for 5 square root polynomials, so that the relationship between the depth of the groove 21 and the surface admittance may be expressed as in Equation 6 below.

$$f(d)=-5.981+22.02d-29.85d^2+20.38d^3-6.874d^4+0.9248d^5 \quad \text{[Equation 6]}$$

Figure 3:
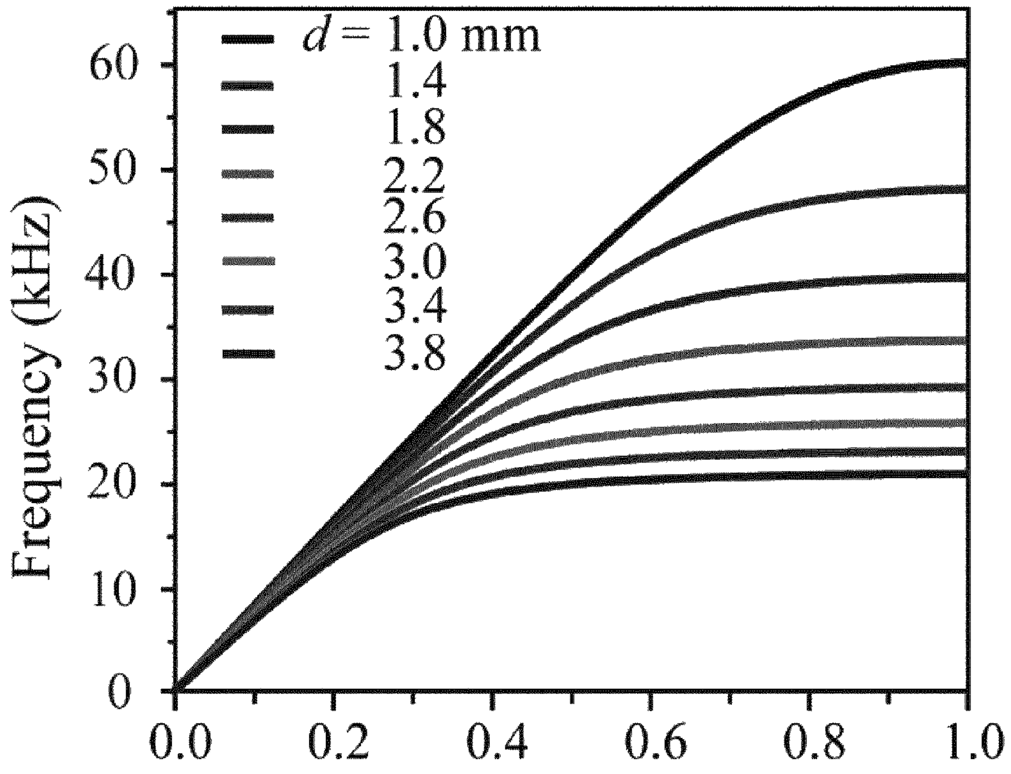
FIG. 3 is a graph showing a dispersion curve of a surface wave with respect to the depth of a groove for a unit cell in a holographic-based directional sound device according to a preferred embodiment of the present invention.

Where, the depth of the groove 21 is in a unit of mm, and when the depth of the groove 21 is 2.5 mm or more at an acoustic frequency of 30 kHz according to the dispersion curve of FIG. 3, it is confirmed that there is no surface mode, whereby the maximum value for the depth of the groove 21 is set to 2.5 mm.

It is possible to obtain a desired radiation pattern for a sound wave, because the pattern of the admittance surface may be designed similarly to the EM scalar holographic surface, and the propagation and emission of the surface waves may be controlled according to the acoustic holographic admittance surface.

The surface of the flat plate 20 may be designed to generate according to the mutual interference of the surface wave and the radiation wave. Here, assuming that the surface wave generated at the center of the flat plate 20 is a cylindrical surface wave, the surface wave may be represented as $\Psi e^{-jknr}$, and a radiation wave radiated at an angle θ with respect to the normal of the XY plane may be represented as $\Psi e^{jkx\sin\theta}$.

Then, the surface admittance may be obtained from the mutual interference of the surface wave and the radiation wave as expressed in Equation 7 below.

$$Y/jY_0=Y_{avg}[1+M\cos(knr+kx\sin\theta)] \quad \text{[Equation 7]}$$

Where, $Y_0$ is the surface admittance of the surrounding medium, $Y_{avg}$ is the average surface admittance to the surface of the flat plate 20, M is the modulation depth, k is the frequency of the sound wave, n is a refractive index determined in advance according to the planar structure of the flat plate 20, r is the radial distance from the center of the flat plate 20 to the unit cell 20*a*, x is the position on the surface of the flat plate 20 with respect to the unit cell 20*a*.

Here, the modulation depth is changed only from 0 to 1 to calculate only the positive surface admittance, and the leakage rate of the holographic acoustic admittance surface may be controlled according to the modulation depth. That is, the higher the modulation depth, the larger the radiation width of the sound wave, which is a leaky wave, and the lower the modulation depth, the smaller the radiation width of the sound wave.

That is, when the predetermined radiation angle and frequency of the sound wave are substituted into Equation 1, the surface admittance for each unit cell 20*a* constituting the surface of the flat plate 20 may be calculated.

In addition, when the surface admittance calculated for each unit cell 20*a* is substituted into the Y-axis value of the graph of FIG. 5 showing the relationship between the depth of the groove 21 and the surface admittance, the depth of the groove 21 for each unit cell 20*a* may be calculated through the corresponding X-axis value.

Accordingly, when processing the groove 21 of each unit cell 20*a* to the depth of the calculated groove 21, the surface of the flat plate 20 made of each unit cell 20*a* may have a holographic acoustic admittance surface capable of radiating a sound wave at a predetermined radiation angle of the sound wave.

Here, for the purpose of the design of the holographic admittance surface, $Y_{avg}=1$, M=0.6 are used as parameters. FIG. 6 shows the surface admittance of the flat plate 20 that radiates sound waves at an angle of 45° with respect to the normal of the XY plane.

For the performance experiment, as shown in FIG. 1, a circular flat plate 20 having a diameter of 40 mm was manufactured, by performing 3D printing for transparent thermoplastic resin using Object30 pro 3D printer, and holes of a diameter of 1 mm were drilled in the center of the flat plate 20.

Figure 7:
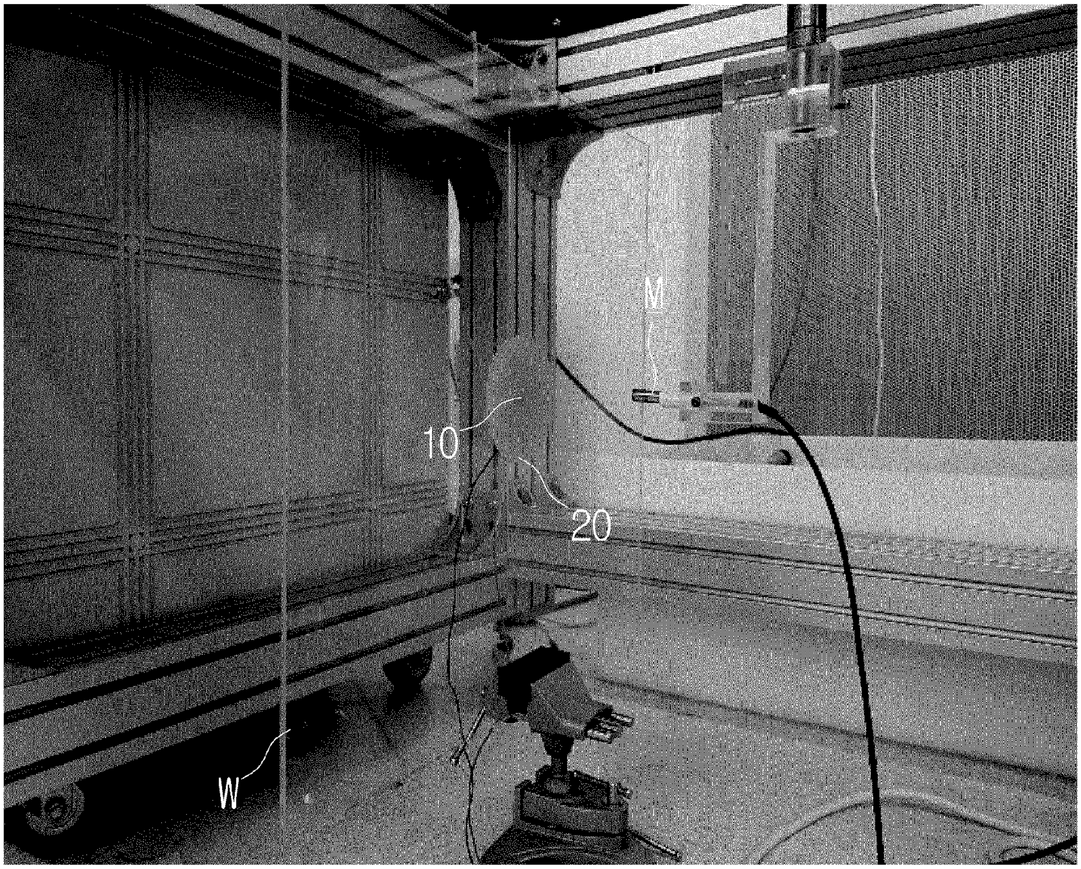
FIG. 7 is an image illustrating a performance test environment of a holographic-based directional sound device according to a preferred embodiment of the present invention.
Figure 8:
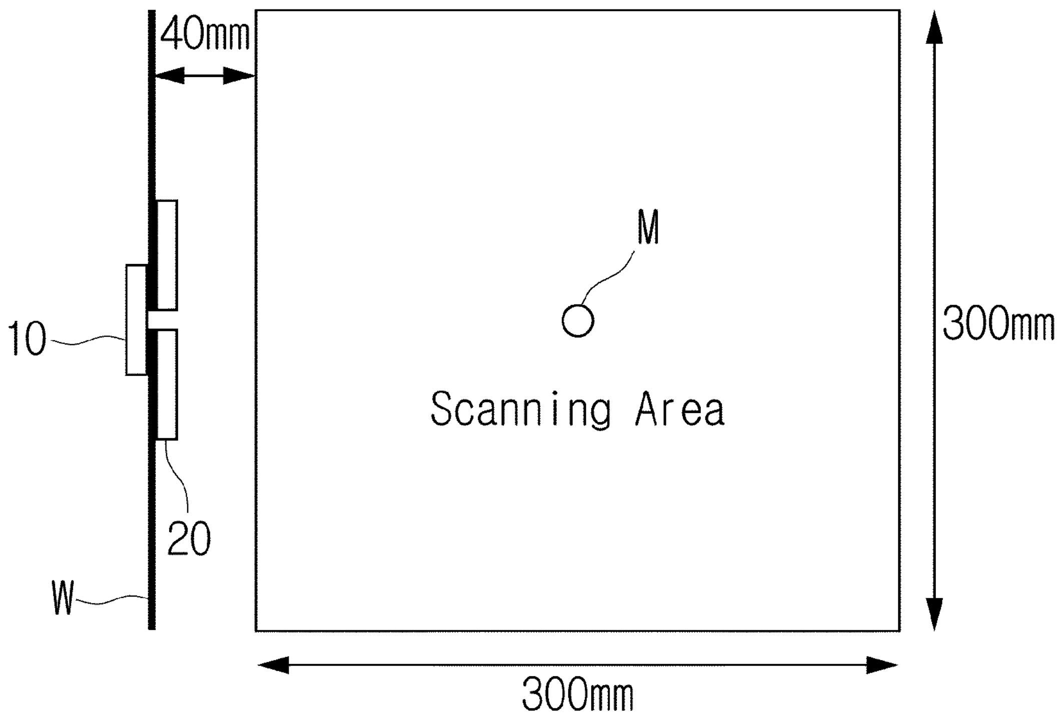
FIG. 8 is a schematic diagram illustrating a performance experiment environment of a holographic-based directional sound device according to a preferred embodiment of the present invention.

FIG. 7 is an image showing a performance experiment environment of a holographic-based directional sound device according to a preferred embodiment of the present invention, and FIG. 8 is a schematic diagram illustrating a performance test environment of a holographic-based directional sound device according to a preferred embodiment of the present invention.

According to FIGS. 7 and 8, a flat plate 20 was placed on the front of the wall W and a speaker that is a sound wave generating means 10 was placed on the rear of the wall W, so that the sound field was radiated toward the circular flat plate 20 through the sound wave generating means 10. As shown in FIG. 8, the sound pressure was measured by scanning an area of 300×300 mm in the XY plane at 10 mm intervals through a GRAS 46E ¼ inch microphone M.

Figure 9A:
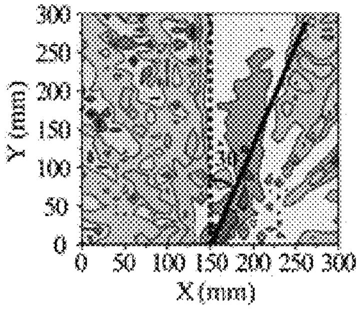
FIGS. 9A-9F are images showing sound pressure test results and FEM test results of radiation having directivity of 30°, 45°, and 60° with respect to the normal of the XY plane, in a holographic-based directional sound device according to a preferred embodiment of the present invention.
Figure 9B:
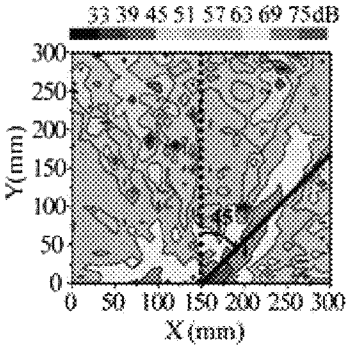
Figure 9C:
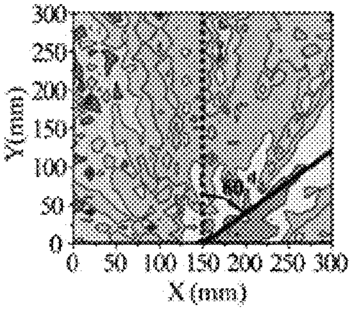
Figure 9D:
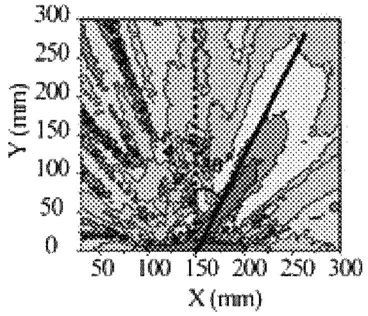
Figure 9E:
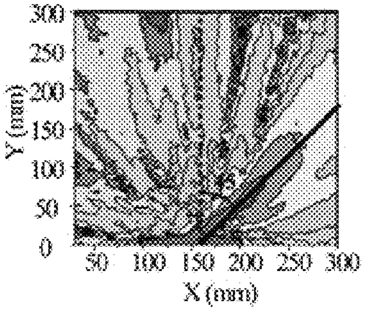
Figure 9F:
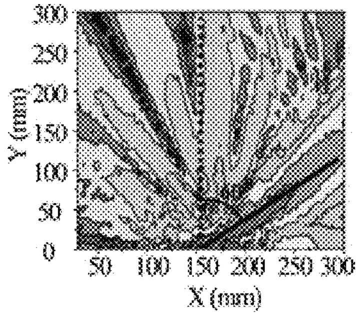

In FIGS. 9A-9C show the sound pressure test results of sound waves with directivity of 30°, 45°, 60° with respect to the normal of the XY plane, respectively. FIGS. 9D-9F show the FEM experiment results of sound waves having radiation angles of 30°, 45°, and 60° with respect to the normal of the XY plane, respectively.

According to FIGS. 9A-9F, it may be confirmed that the far field radiation according to the surface admittance of the flat plate 20 provides a strong directional sound field in the XY plane according to the surface admittance pattern, and the experimental results are consistent with the numerical results.

Figure 10:
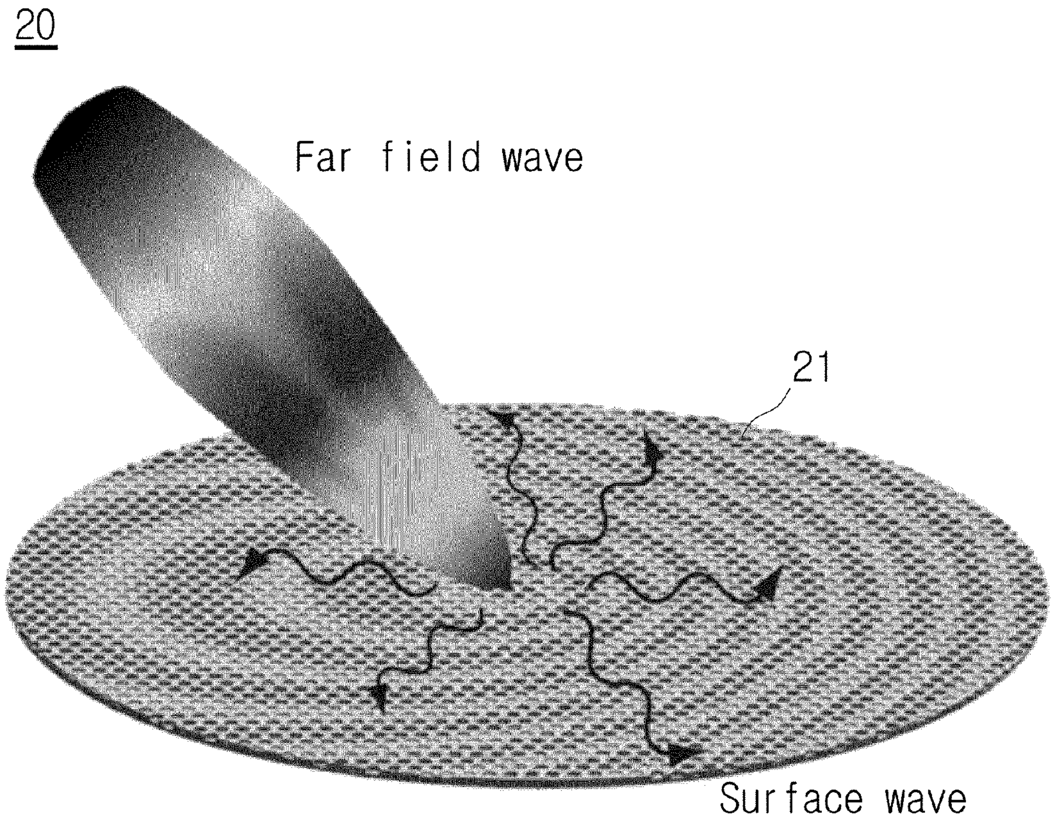
FIG. 10 is an exemplary view showing a beam shape in which a surface wave of a circular pattern having a holographic surface admittance is radiated in the radial direction and the radiation wave according to the surface wave is radiated at a certain angle along the normal direction at a specific frequency, by the flat plate of the holographic-based directional sound device according to a preferred embodiment of the present invention.

FIG. 10 is an exemplary view showing the shape of the surface wave of the circular pattern and a radiation wave radiated at a certain angle along the normal direction, by the flat plate in the holographic-based directional sound device according to the preferred embodiment of the present invention.

According to FIG. 10, it may be seen that a surface wave of a circular pattern is generated by the holographic surface admittance in the radial direction designed on the surface of the flat plate 20, and the radiation wave according to the surface wave is radiated in the form of a beam at a certain angle along the normal direction by the hologram surface admittance.

Finally, the sound wave receiving means is configured to receive a sound wave radiated at a predetermined radiation angle through the surface of the flat plate 20.

The above-described embodiments are merely exemplary, and those of ordinary skill in the art can practice variously modified embodiments therefrom.

Therefore, the true technical protection scope of the present invention should include not only the above embodiments but also other variously modified embodiments by the technical spirit of the invention described in the claims below.

INDUSTRIAL AVAILABILITY

The present invention can be widely used in directional sound-related fields that require a function to radiate sound waves in a specific direction in a specific place by making the sound wave generated by the sound wave generating means to have directivity such that the sound wave is radiated in a specific direction.

The invention claimed is:

1. A holographic-based directional sound device, comprising:

a sound wave generating means generating a sound wave; and a flat plate configured to have the sound wave generating means installed at the center thereof so as to radiate the sound wave to the outside through a surface thereof, and to be composed of a plurality of unit cells, in which at least one groove is formed on a surface of the unit cell, and a radiation angle of the sound wave is determined according to a depth of the groove with respect to the unit cell, wherein the depth of the groove with respect to the unit cell is determined by an individual surface admittance calculated by a cosine function or a sine function of the sum of a first value and a second value on the basis of a predetermined radiation angle of the sound wave and a preset frequency of the sound wave, the first value being obtained by multiplying a frequency of the sound wave by a refractive index according to the surface of the unit cell and a radial distance from the center of the flat plate to the unit cell, and the second value being obtained by multiplying the frequency of the sound wave by a position value of the unit cell and the radiation angle of the sound wave.

2. The device of claim 1, wherein the depth of the groove with respect to the unit cell is determined by multiplying an average surface admittance with respect to the surface of the flat plate, by a value obtained by multiplying a value of a cosine function or a sine function of the sum of a first value and a second value by a predetermined modulation depth value and then adding one, on the basis of a preset radiation angle of the sound wave and a preset frequency of the sound wave, the first value being obtained by multiplying the frequency of the sound waves by a refractive index according to a surface of the unit cell and a radial distance from the center of the flat plate to the unit cell, and the second value being obtained by multiplying the frequency of the sound wave by a position value of the unit cells and the radiation angle of the sound wave.

3. The device of claim 1, wherein the depth of the groove with respect to the unit cell is determined by individual surface admittance calculated by Equation below, $$Y=jY_0Y_{avg}[1+M\cos(knr+kx\sin\theta)] \quad \text{(Equation)}$$

where, $Y_0$ is the surface admittance of surrounding medium, $Y_{avg}$ is the average surface admittance to the surface of the flat plate, M is the modulation depth, k is the frequency of the sound wave, n is the predetermined refractive index according to the planar structure of the flat plate, r is the radial distance from the center of the flat plate to the unit cell, x is a position of the flat plate with respect to the unit cell, and θ is a radiation angle of the sound wave.

4. The device of claim 1, wherein the depth of the groove with respect to the unit cell is formed so that a repetitive periodic curve is formed along the radial direction of the flat plate and is uniformly formed along an elliptical direction on the surface of the flat plate.

5. The device of claim 4, wherein the depth of the groove with respect to the unit cell is formed to have a higher degree of deviation from the circle by increasing a difference between a radius of one side and a radius of the other side at a center in the elliptical direction, so that the sound wave has directivity at the radiation angle along the normal direction with respect to the surface of the flat plate.

6. The device of claim 1, wherein a diameter, depth, and spacing of the groove with respect to the unit cell are formed to be smaller than a wavelength of the sound wave, and the diameter, depth, and spacing of the groove for the unit cells adjacent to each other are formed differently to have different surface admittances.

7. The device of claim 1, wherein the unit cell has a polygonal shape.

8. The device of claim 1, wherein the groove has a cylindrical or polygonal shape.

9. The device of claim 1, wherein the grooves are formed at the center and a corner end of the unit cell, respectively.

10. The device of claim 1, further comprising:

a sound wave receiving means for receiving the sound wave radiated from the surface of the flat plate.

* * * * *